United States Patent [19]

Mukai et al.

[11] Patent Number: 4,834,406

[45] Date of Patent: May 30, 1989

[54] FOUR-WHEEL STEERING SYSTEM FOR VEHICLE

[75] Inventors: Yoshiaki Mukai; Hirotaka Kanazawa, both of Hiroshima; Koushun Note, Higashhiroshima; Yasuhiro Nakashima, Hiroshima, all of Japan

[73] Assignee: Mazda Motor Corporation, Hiroshima, Japan

[21] Appl. No.: 141,729

[22] Filed: Jan. 11, 1988

[30] Foreign Application Priority Data

Jan. 9, 1987 [JP] Japan .................................. 62-2901

[51] Int. Cl.⁴ .......................... B62D 7/00; B62D 7/16; B62D 15/00
[52] U.S. Cl. ......................................... 280/91; 180/79
[58] Field of Search ..................... 280/91, 98, 99, 103; 180/79.1, 79.3

[56] References Cited

U.S. PATENT DOCUMENTS 3,183,991  5/1965  Gamaunt ............................... 180/24
4,467,885  8/1984  Furukawa et al. ................. 180/140
4,691,932  9/1987  Hyodo ................................... 280/91
4,703,822  11/1987  Kawamoto ........................... 280/91
4,719,981  1/1988  Miyoshi ................................. 280/91

FOREIGN PATENT DOCUMENTS 59-081276  5/1984  Japan .
61-080169  5/1986  Japan .

Primary Examiner—Richard A. Bertsch
Attorney, Agent, or Firm—Fleit, Jacobson, Cohn & Price

[57] ABSTRACT

A four-wheel steering system for a vehicle in which the rear wheels of a vehicle are turned in response to the turning of the front wheels of the vehicle upon operation of a steering wheel. The rear wheel steering is derived from the front wheel steering by way of a transmission shaft. The transmission shaft is supported rotatably and for sliding movement in the axial direction by way of a bearing fixed on the vehicle body. A stopper ring is fixed on the transmission shaft a short distance forward from the bearing to limit the backward sliding of the transmission shaft.

27 Claims, 4 Drawing Sheets

FOUR-WHEEL STEERING SYSTEM FOR VEHICLE

BACKGROUND OF THE INVENTION

1. Field of the Invention

The present invention relates to a steering system for a vehicle, and more particularly to a four-wheel steering system for a vehicle in which the rear wheels are arranged to be turned in response to the turning of the front wheels when the steering wheel is turned.

2. Description of the Prior Art

Conventionally, a four-wheeled vehicle has a steering system which is adapted to steer only the front wheels. It has however been proposed for the purpose of improving the maneuverability of the vehicle to steer not only the front wheels but also the rear wheels. For example, the U.S. Pat. No. 4,467,885 discloses a four-wheel steering system for a vehicle in which a front wheel steering mechanism and a rear wheel steering mechanism are mechanically connected by way of a transmission shaft so that the rear wheels are turned in response to the turning of the front wheels.

Further, in the four-wheel steering system disclosed in Japanese Utility Model Public Disclosure No. 61-80169 filed on Oct. 31, 1984 and laid open to the public on May 28, 1986, a front wheel steering mechanism is mounted on a dash lower panel partitioning a cabin and an engine compartment, and is situated rearward of the engine and forward of the dash lower panel. A transmission shaft is supported rotatably and slidably in the axial direction by bearings fixed to a flower panel.

Further, the U.S. Pat. No. 3,183,991 discloses a four-wheel steering system for a vehicle in which a transmission shaft is jointed by means of a splined slipjoint.

It should be noted that the transmission shaft and the front wheel steering mechanism are moved or forced back quite easily if the engine is moved or forced back, for instance, due to an accident or crash resulting in a force being imposed on the vehicle in a longitudinal backward direction. An example would be a head-on collision. Under these circumstances, rearward movement of the engine would cause the engine to hit or strike against the front wheel steering mechanism, which, in turn, will drive the dash lower panel backwardly into the cabin where passengers are sitting. Known four-wheel steering systems do not make any provision to resist or withstand against such backward loads resulting from crashes. The desirability of preventing or resisting backward movement of the front wheel steering mechanism and the dash lower panel due to collisions will be appreciated.

SUMMARY OF THE INVENTION

It is, therefore, the principal object of the present invention to provide a four-wheel steering system having resistance against backward loads due to collisions to prevent the dash lower panel from being driven back into the passenger cabin and causing personal injuries to passengers. It is another object of the present invention to limit the rearward movement of the transmission interconnecting the front and rear wheel steering mechanisms.

According to the present invention, the above and other objects are accomplished by utilization of a four-wheel steering system in accordance with the teachings of the present invention. The novel system comprises a manually operated steering member, front wheel steering means coupled with the steering member for producing steering movements in the vehicle front wheels in accordance with movements of the steering member, rear wheel steering means for producing steering movements in vehicle rear wheels in accordance with movements of the steering member, a transmission shaft means connecting the front wheel steering means and said rear wheel steering means for transmitting the movements of the steering member to the rear wheel steering means, a bearing means fixed on the vehicle body for supporting the transmission shaft means rotatably and slidably in the axial direction of the transmission shaft means, a stopper means fixed on the transmission shaft means and disposed a predetermined distance forward of the bearing means to prevent the transmission shaft means from sliding backwardly due to an impact.

According to the features of the present invention, when the vehicle experiences a head-on collision or crash, the backward force generated and imposed on the front wheel steering mechanism produces limited movement, because the stopper means hit against the bearing means. Therefore, safety is greatly improved.

The above and other objects and features of the present invention will become apparent from the following description of a preferred embodiment making reference to the accompanying drawings.

DESCRIPTION OF THE PREFERRED EMBODIMENT

Figure 1:
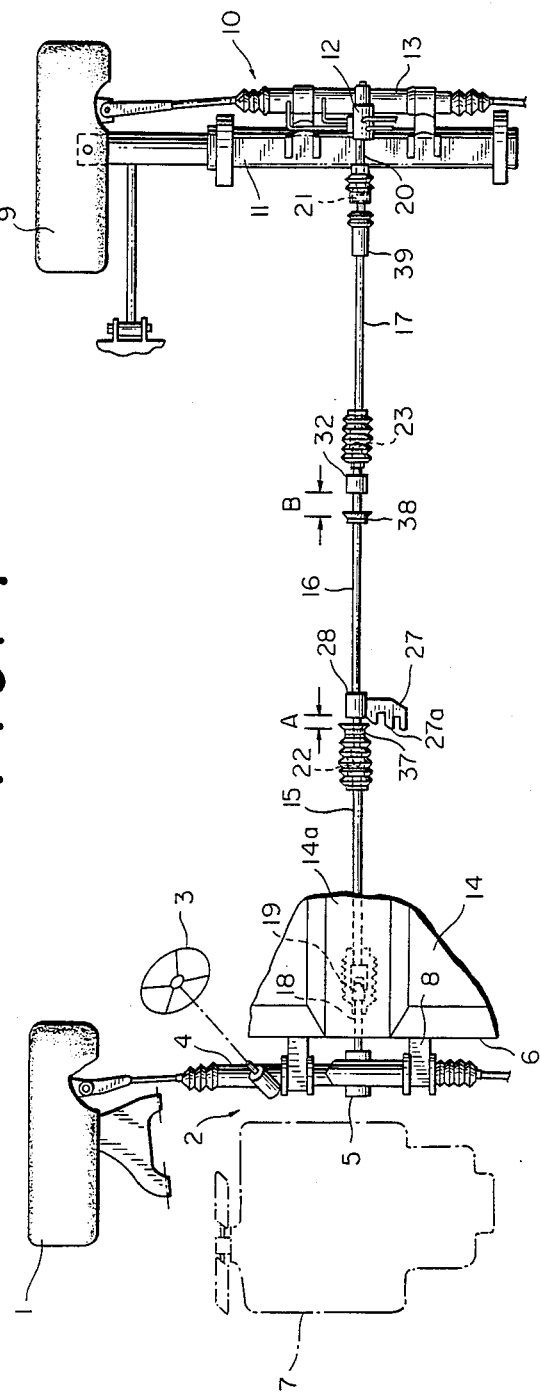
FIG. 1 is a fragmentary plan view schematically showing a four-wheel steering system in accordance with an embodiment of the present invention.
Figure 2:
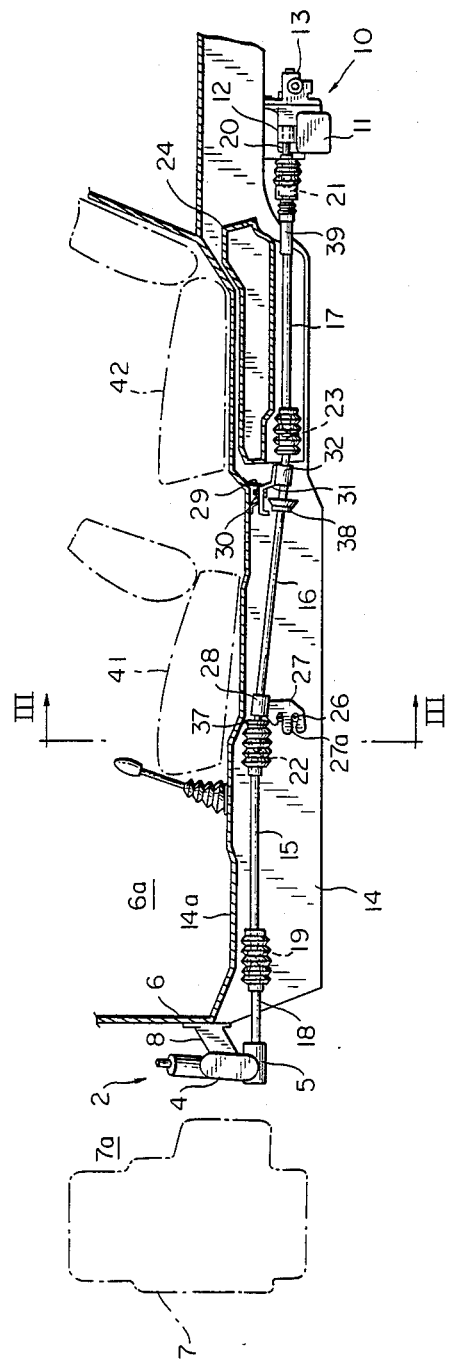
FIG. 2 is a fragmentary side view of the steering system.

Referring now to the drawings, and particularly to FIGS. 1 and 2, a vehicle is illustrated which includes a steering wheel 3 which upon rotation transmits its movements to a rack-and-pinion mechanism 4, via a conventional mechanical connection. The rack-and-pinion mechanism 4 is part of the steering gear of the vehicle and turns front wheels 1 in response to movements of steering wheel 3. A gearbox 5 is fixed to the steering gear or rack-and-pinion mechanism 4. A rack in the rack-and-pinion mechanism 4 meshes with a pinion in the gearbox 5 which rotates responsive to rack movement. The pinion is connected to and drives an output shaft 18, which projects or extends rearwardly from the gearbox 5. Thus, the rack-and-pinion mechanism 4 and the gearbox 5 together constitute the principal components of a front wheel steering gear or mechanism. The front wheel steering mechanism is mounted by brackets 8 on a dash lower panel 6 partitioning a cabin 6a for passengers and an engine compartment 7a. This mounting is situated rearwardly of vehicle engine 7 and forwardly of the dash lower panel 6.

A rear wheel steering mechanism 10 is mounted on a rear subframe 11 by brackets or any suitable or conventional means. A power cylinder is provided in a rack housing 13 including a rear wheel control valve 12. Pressurized oil is fed through valve 12 in response to rotation of an input shaft 20 to turn rear wheels 9. This general arrangement is known.

The rear wheel steering mechanism 10 connects to the front wheel steering mechanism 2 by a series of three transmission shafts 15, 16, 17 connected end-to-end. The transmission shaft 15 is connected to the output shaft 18 by way of a universal joint 19, and is connected to the transmission shaft 16 by way of a universal joint 22. The transmission shaft 17 is connected to the input shaft 20 by way of a universal joint 21, and is connected to the transmission shaft 16 by way of a universal joint 23. Rotation of the output shaft 18 is transmitted via the transmission shafts and universal joints to the input shaft 20. Transmission shafts 15, 16 are disposed in a tunnel 14a defined as an inverted U shape by floor panel 14. Transmission shaft 17 is situated below fuel tank 24 located beneath rear seat 42.

Figure 3:
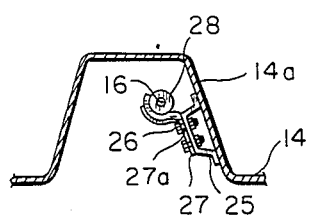
FIG. 3 is a cross-sectional view taken along line III—III of FIG. 2.

A front portion of transmission shaft 16 is supported rotatably and slidably in the axial direction by a bearing 28. As evident from FIG. 3, a bracket 27, fixed to the bearing 28, is connected by bolts 26 to a mounting member 25, fixed to the inside wall of the tunnel portion 14a. A rear portion of the transmission shaft 16 is supported rotatably and slidably in the axial direction by a bearing 32. As evident from FIG. 9, a bracket 31, fixed to the bearing 32, is bolted by bolts 30 to a mounting member 29, fixed to the upper wall of the tunnel portion 14a.

Figure 8:
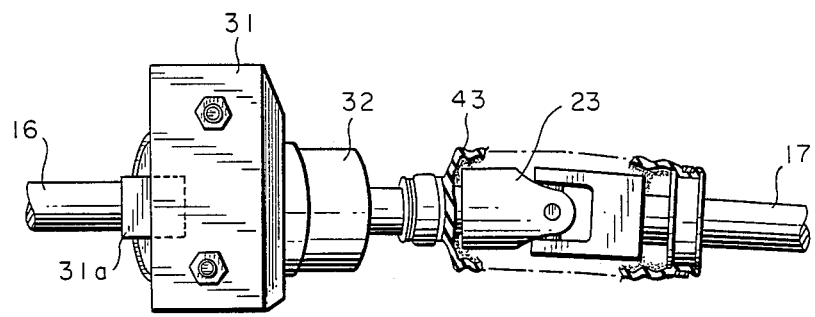
FIG. 8 is an enlarged view showing another universal joint and another bearing.
Figure 9:
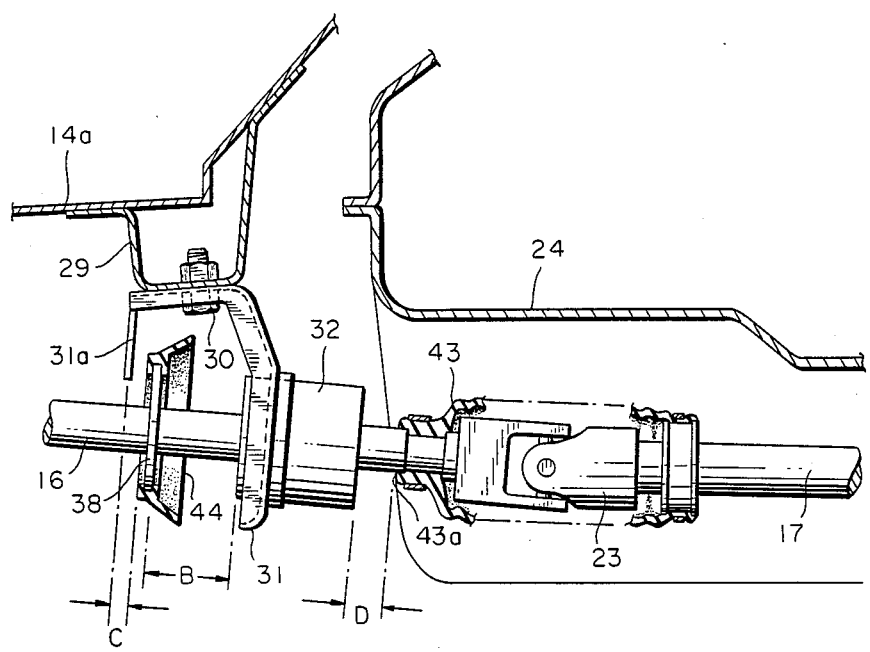
FIG. 9 is an enlarged view similar to FIG. 8 partly in cross section.

Referring to FIGS. 2, 3, 6 and 7, bracket 27 has two notch portions 27a which open in the frontward direction. Bolts 26 pass through the notch portions 27a, connecting the bracket 27 with the mounting member 25. Referring to FIGS. 8 and 9, the bolts 30 pass through holes in the bracket 31, connecting the bracket 31 with the mounting member 29. Therefore, under a rearward load against the brackets 27, 31, the holding force or fastness of the connection of the second bracket 31 is stronger than that of the bracket 27.

Figure 4:
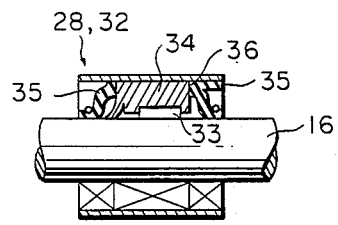
FIG. 4 is an enlarged sectional view showing the bearing.

With reference to FIG. 4, bearings 28, 32 consist of bearing needles 33 disposing around the shaft 16, a bearing support 34 supporting the bearing needles 33, oil seals 35 disposing on opposite sides of the bearing support 34 for sealing oil in the bearing and an annular housing 36 enclosing support 34, seals 35 and the bearing needles 33.

Figure 7:
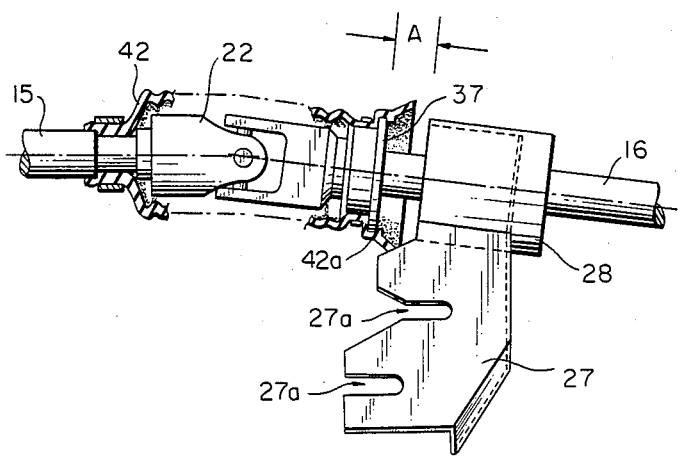
FIG. 7 is an enlarged view similar to FIG. 6 partly in cross section.

Referring to FIGS. 7 and 9, stopper rings 37, 38 are fixed to opposite ends of the transmission shaft 16 by welding. Stopper rings 37, 38 are disc-shaped having the same diameter as the bearings 28, 32. The distance "B" between the bearing 32 and the stopper ring 38 is longer than the distance "A" between the bearing 28 and the stopper ring 37.

Figure 5:
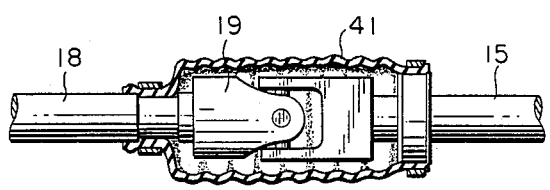
FIG. 5 is an enlarged view showing a universal joint.
Figure 6:
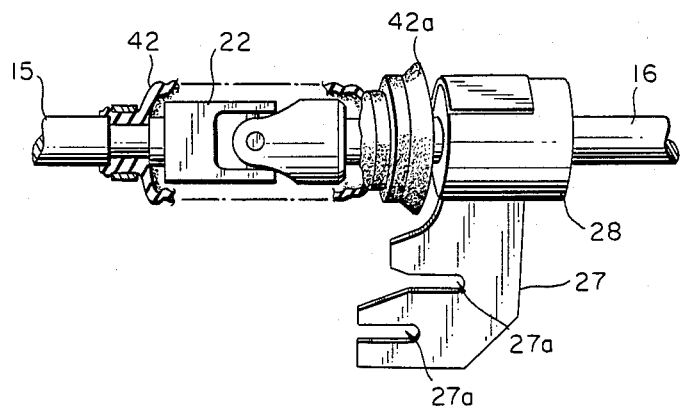
FIG. 6 is an enlarged view showing another universal joint and a bearing mounting.

FIG. 5 shows an enlarged view of the universal joint 19 which is covered by a dust boot 41. Referring to FIGS. 6 and 7, it will be apparent that the front end portion of a dust boot 42 is connected to the transmission shaft 15 with the rear end portion of the dust boot 42 being connected to the stopper ring 37. A deflector 42a integrally formed on the rear end portion of the second dust boot 42 fits around ring 37 and projects rearwardly from stopper ring 37 in the shape of a trumpet.

Referring to FIGS. 8 and 9, one can see a stopper plate 31a which projects downwardly and lies forwardly of ring 38 partly in the same horizontal plane and is fixedly mounted on the front end portion of the second bracket 31. The stopper plate 31a is situated forward of the second stopper ring 38 by a distance "C". The distance "D" between the bearing 32 and a forward end portion 43a of a dust boot 43 covering the universal joint 23 is longer than the distance "C" between the second stopper ring 38 and the stopper plate 31a. A second deflector 44 which projects rearwardly in the shape of a trumpet is mounted on the outer surface of the stopper ring 38.

Figure 10:
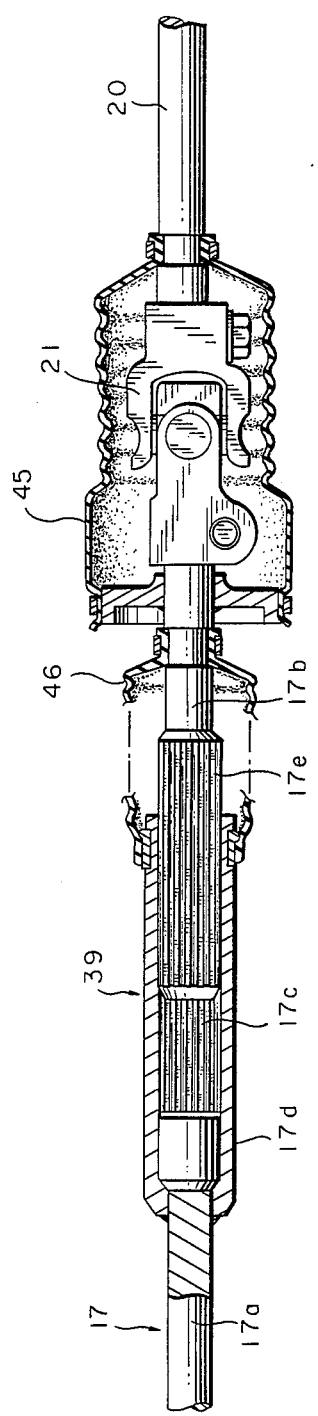
FIG. 10 is an enlarged view showing another universal joint and a splined connection.

Referring to FIG. 10, the universal joint 21 is covered by a dust boot 45. The transmission shaft 17 is divided into a forward shaft portion 17a normally spaced from a rearward shaft portion 17b. The forward shaft portion 17a is joined to the rearward shaft portion 17b by an axially movable slip joint 39. The slip joint 39 consists of a splined portion 17c formed on the inner surface of a cylindrical sleeve 17d connected to the forward shaft portion 17a, and a splined portion 17e which is formed on the outer surface of the rearward shaft portion 17b. The two splined portions engage for relative axial displacement. Therefore, under a rearward load against the transmission shaft 17, the shaft portion 17a is displaced rearwardly by the normal spacing whereby shaft 17 is contracted. The splined portion 17e is covered by a dust boot 46.

Figure 11:
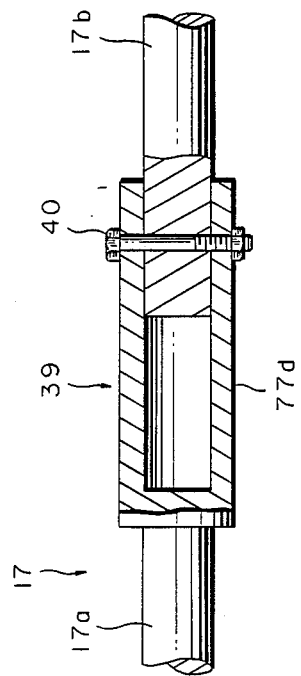
FIG. 11 is a view showing another connection.

Now referring to FIG. 11, a second embodiment of the slip joint 39 is shown. In this embodiment, the slip joint 39 consists of a cylindrical sleeve 77d forming an extension of shaft portion 17a. The rearward shaft portion 17b is axially slidably received in sleeve 77d and a shear pin 40 connects the cylindrical sleeve 77d and the rearward shaft portion 17b with shaft portion 17b spaced from shaft portion 17a or available to slide axially into sleeve 77d. Therefore, under a rearward load against the transmission shaft 17, the shear pin 40 will be sheared off and the shaft 17 contracted.

Having described the invention in detail, its operation now will be described. Referring initially to FIGS. 1 and 2, when the vehicle embodied with the invention experiences a head-on crash, the engine 7 will be forced backwardly and hit or strike against the front wheel steering mechanism 2 pushing the front wheel steering mechanism 2 backwards. If the backward load is strong or severe, the dash lower panel 6 will be transformed and moved back causing the transmission shaft 17 to contract in the slip joint 39. If the backward load is not too severe or weaker than a predetermined load, the backward movement of the transmission shaft 16 will be limited by the stopper ring 37 hitting against the bearing 28. In other words, the backward movement of the transmission shaft 16 is limited within the dimension "A".

When the backward load is stronger than the predetermined load, the notch portions 27a of the bracket 27 will slip out of the bolts 26. Therefore, the transmission shaft 16 will be moved back until the stopper ring 38 hits against the bearing 32, limiting the backward movement of the transmission shaft 16. In other words, the backward movement of the transmission shaft 16 is limited within the dimension "B".

Accordingly, the backward movement of the dash lower panel 6 is limited within the dimension "A", when the backward load is weaker than the predetermined load. The backward movement of the dash lower panel 6 is limited within the dimension "B", when the backward load is stronger than the predetermined load in the worst case.

Referring to FIG. 2, it can be seen that this dimension "B" is selected so that movement of dash lower panel 6 will never threaten the security of the passengers sitting in front seats 41, not to speak of the passengers sitting in rear seats 42.

Furthermore, the bracket 31, the bearing 32 and the universal joint 23 do not hit against the fuel tank 24, because the backward movement of the shaft 16 is definitively limited. Therefore, safety improves all the more.

Furthermore, substances (as show, mud, dust) thrown, curled or kicked up by the front wheels 1 flies at the front of the bearings 28, 32. If these substances stick to the sliding surface of the shaft 16, the rotation of the shaft will not be smooth. According to the invention, deflectors 42a, 44 prevent these substances from sticking to the sliding surface of the shaft 16; the substances do not stick well to the deflectors 42a, 44 because the deflectors 42a, 44 rotate with the shaft 16.

Referring to FIG. 2, in particular, the working steps to mount the four-wheel steering system on the vehicle body will now be described. As step 1, the front and rear wheel steering mechanisms 2, 10 are mounted on the vehicle body. As step 2, the shafts 15, 16, 17 are connected by way of the universal joints 22, 23 on the vehicle body, and the brackets 27, 31 are connected to the mounting members 25, 29 by the bolts 26, 30. As step 3, the shaft 15 is connected with the shaft 18, and the shaft 17 is connected with the shaft 20. In step 2, the shaft 16 is free to slide in the axial direction and, if the shaft 16 were to slide too far forward, the oil seal 35 of the bearing 35 would be broken by a forward end portion 43a of the third dust boot 43. However, if the shaft 16 starts to slide forward, the stopper ring 38 will hit against the stopper plate 31a before the forward end portion 43a of the dust boot 43 hits against the oil seal 35 of the bearing 32. Therefore, the stopper ring 38 and the stopper plate 31a prevent the oil seal 35 from being broken during assembly.

Although the invention has been described with respect to a preferred embodiment, changes and modifications are possible which do not depart from the spirit, scope and contemplation of the invention, and, therefore, such are deemed to fall within the purview of the present invention as claimed.

What is claimed is:

1. A four-wheel steering system for a vehicle comprising:

vehicle body means for mounting a steering mechanism;

a pair of steerable front wheels and a pair of steerable rear wheels mounted on said body means;

a manually operated steering member mounted on said body means;

front wheel steering means coupled with said steering member for producing steering movements in the vehicle front wheels;

rear wheel steering means for producing steering movements in the vehicle rear wheels;

transmission shaft means connecting said front wheel steering means and said rear wheel steering means for transmitting movement of the steering member to the rear wheel steering means;

bearing means mounted on the vehicle body means for supporting an intermediate portion of said transmission shaft means between said front wheel steering means and said rear wheel steering means rotatably and slidably in an axial direction; and stopper means fixed on the transmission shaft means and disposed forward at a predetermined distance from the bearing means to limit the backward sliding movement of the transmission shaft means so that the stopper means is received by the bearing means when the transmission shaft means moves said predetermined distance backward along the axial direction with respect to the vehicle body means.

2. A four-wheel steering system in accordance with claim 1 in which said bearing means includes a first bearing means and a second bearing means and said stopper means includes a first stopper means cooperating with said first bearing means, and a second stopper means cooperating with said second bearing means.

3. A four-wheel steering system in accordance with claim 2 in which the distance between said first bearing means and said first stopper means is shorter than the distance between said second bearing means and said second stopper means.

4. A four-wheel steering system in accordance with claim 3 in which the strength of the mounting of the first bearing means with the vehicle body means is weaker than the strength of the mounting of the second bearing means with the vehicle body means.

5. A four-wheel steering system in accordance with claim 4 in which the first bearing means includes a first bearing, a first bracket fixed to the first bearing with said first bracket having a notch portion opening frontwardly, and a bolt passing through said notch portion and connecting said first bracket with the vehicle body means; the second bearing means includes a second bearing, a second bracket having a hole fixed to the second bearing, and a bolt passing through said hole and connecting said second bracket with the vehicle body means.

6. A four-wheel steering system in accordance with claim 5 in which said transmission shaft means is provided with a slip joint means allowing contraction in the axial direction of said transmission shaft means, said slip joint means being disposed rearward of said first and second bearing means.

7. A four-wheel steering system in accordance with claim 1 in which said body means includes a dash lower panel partitioning same to define an engine compartment and a passenger compartment, an engine is mounted in said engine compartment, said front wheel steering means being disposed rearward of said engine and forward of said dash lower panel.

8. A four-wheel steering system in accordance with claim 7 in which said transmission shaft means is disposed in a tunnel portion of a floor panel included as part of the vehicle body means.

9. A four-wheel steering system in accordance with claim 8 in which a rear portion of said transmission shaft means passes downward beneath a fuel tank included as part of the vehicle body means, and said bearing means is disposed forward of the fuel tank.

10. A four-wheel steering system in accordance with claim 7 in which said transmission shaft means includes a front transmission shaft, a center transmission shaft, and a rear transmission shaft, said front transmission shaft being connected with said center transmission shaft by way of a universal joint, said rear transmission shaft being connected with said center transmission shaft by way of a universal joint, said bearing means supporting said center transmission shaft, said stopper means being fixed on said center transmission shaft.

11. A four-wheel steering system in accordance with claim 10 in which said rear transmission shaft is provided with axially contractable slip joint means.

12. A four-wheel steering system in accordance with claim 1 in which said transmission shaft means is disposed beneath a floor panel included as part of the vehicle body means, and a deflector is further provided to deflect foreign substances from the bearing means.

13. A four-wheel steering system in accordance with claim 12 in which said deflector is mounted on an outer face of said stopper means.

14. A four-wheel steering system for a vehicle comprising:
vehicle body means for mounting a steering mechanism;
a pair of steerable front wheels and a pair of steerable rear wheels mounted on said body means;
a manually operated steering member mounted on said body means;
front wheel steering means coupled with said steering member for producing steering movements in the vehicle front wheels;
rear wheel steering means for producing steering movements in the vehicle rear wheels;
transmission shaft means connecting said front wheel steering means and said rear wheel steering means for transmitting movement of the steering member to the rear wheel steering means;
bearing means mounted on the vehicle body means for supporting said transmission shaft means rotatably and axially slidably; and
stopper means fixed on the transmission shaft means and disposed forward at a predetermined distance from the bearing means to limit the backward sliding movement of the transmission shaft means;
said bearing means including a first bearing means and a second bearing means and said stopper means including a first stopper means cooperating with said first bearing means and a second stopper means cooperating with said second bearing means.

15. A four-wheel steering system in accordance with claim 14, in which the distance between said first bearing means and said first stopper means is shorter than the distance between said second bearing means and said second stopper means.

16. A four-wheel steering system in accordance with claim 15, in which the strength of the mounting of the first bearing means with the vehicle body means is weaker than the strength of the mounting of the second bearing means with the vehicle body means.

17. A four-wheel steering system in accordance with claim 16, in which the first bearing means includes a first bearing, a first bracket fixed to the first bearing with said first bracket having a notch portion opening frontwardly, and a bolt passing through said notch portion and connecting said first bracket with the vehicle body means, the second bearing means including a second bearing, a second bracket having a hole fixed to the second bearing, and a bolt passing through said hole and connecting said second bracket with the vehicle body means.

18. A four-wheel steering system in accordance with claim 17, in which said transmission shaft means is provided with slip joint means allowing contraction in the axial direction of said transmission shaft means, said slip joint means being disposed rearward of said first and second bearing means.

19. A four-wheel steering system in accordance with claim 14, in which said body means includes a dash lower panel partitioning same to define an engine compartment and a passenger compartment, an engine is mounted in said engine compartment, said front wheel steering means being disposed rearward of said engine and forward of said dash lower panel.

20. A four-wheel steering system in accordance with claim 19, in which said transmission shaft means is disposed in a tunnel portion of a floor panel included as part of the vehicle body means.

21. A four-wheel steering system in accordance with claim 20, in which a rear portion of said transmission shaft means passes downward beneath a fuel tank included as part of the vehicle body means, and said bearing means is disposed forward of the fuel tank.

22. A four-wheel steering system in accordance with claim 19, in which said transmission shaft means includes a front transmission shaft, a center transmission shaft, and a rear transmission shaft, said front transmission shaft being connected with said center transmission shaft by way of a universal joint, said rear transmission shaft being connected with said center transmission shaft by way of a universal joint, said bearing means supporting said center transmission shaft, said stopper means being fixed on said center transmission shaft.

23. A four-wheel steering system in accordance with claim 22, in which said rear transmission shaft is provided with axially contractible slip joint means.

24. A four-wheel steering system in accordance with claim 14, in which said transmission shaft means is disposed beneath a floor panel included as part of the vehicle body means, and a deflector is further provided to deflect foreign substances from the bearing means.

25. A four-wheel steering system in accordance with claim 24, in which said deflector is mounted on an outer face of said stopper means.

26. A four-wheel steering system for a vehicle comprising:
vehicle body means for mounting a steering mechanism;
a pair of steerable front wheels and a pair of steerable rear wheels mounted on said body means;
a manually operated steering member mounted on said body means;
front wheel steering means coupled with said steering member for producing steering movements in the vehicle front wheels;
rear wheel steering means for producing steering movements in the vehicle rear wheels;
transmission shaft means connecting said front wheel steering means and said rear wheel steering means for transmitting movement of the steering member to the rear wheel steering means;
bearing means mounted on the vehicle body means for supporting said transmission shaft means rotatably and axially slidably; and stopper means fixed on the transmission shaft means and disposed forward at a predetermined distance from the bearing means to limit the backward sliding movement of the transmission shaft means, said transmission shaft means being provided with slip joint means allowing contraction in the axial direction of said transmission shaft means, said slip joint means being disposed rearward of said bearing means.

27. A four-wheel steering system in accordance with claim 26, in which said slip joint means is located forward of the rear wheel steering means.

* * * * *